(12) United States Patent
Yavits et al.

(10) Patent No.: US 7,088,771 B2
(45) Date of Patent: Aug. 8, 2006

(54) VIDEO ENCODING AND VIDEO/AUDIO/DATA MULTIPLEXING DEVICE

(75) Inventors: Leonid Yavits, Haifa (IL); Amir Morad, Tel Aviv (IL)

(73) Assignee: Broadcom Corporation, Irvine, CA (US)

( * ) Notice: Subject to any disclaimer, the term of this patent is extended or adjusted under 35 U.S.C. 154(b) by 678 days.

(21) Appl. No.: 10/282,736

(22) Filed: Oct. 29, 2002

(65) Prior Publication Data

US 2003/0048847 A1    Mar. 13, 2003

Related U.S. Application Data

(62) Division of application No. 09/543,904, filed on Apr. 6, 2000, now Pat. No. 6,690,726.

(30) Foreign Application Priority Data

Apr. 6, 1999    (IL)    ..................... 129345

(51) Int. Cl.
*H04B 1/66*    (2006.01)
(52) U.S. Cl. .............................. 375/240.01
(58) Field of Classification Search ........... 375/240.04, 375/240.12, 240.11, 240.13, 240.25, 240.01; 348/390.1; H04B 1/66
See application file for complete search history.

(56) References Cited

U.S. PATENT DOCUMENTS

| | | | |
|---|---|---|---|
| 5,159,447 A * | 10/1992 | Haskell et al. | 375/240.05 |
| 5,216,503 A * | 6/1993 | Paik et al. | 348/390.1 |
| 5,283,646 A | 2/1994 | Bruder et al. | |
| 5,510,857 A | 4/1996 | Kopet et al. | |
| 5,592,399 A | 1/1997 | Keith et al. | |
| 5,598,514 A | 1/1997 | Purcell et al. | |
| 5,623,311 A | 4/1997 | Phillips et al. | |
| 5,748,240 A | 5/1998 | Carr et al. | |
| 5,793,425 A | 8/1998 | Balakrishnan | |
| 5,825,424 A | 10/1998 | Canfield et al. | |
| 5,864,583 A | 1/1999 | Ozkan | |
| 5,877,812 A * | 3/1999 | Krause et al. | 375/240.25 |
| 5,900,906 A | 5/1999 | Murakumo et al. | |
| 6,005,621 A | 12/1999 | Linzer et al. | |
| 6,026,097 A * | 2/2000 | Voois et al. | 370/468 |
| 6,058,122 A | 5/2000 | Hwang et al. | |
| 6,091,455 A | 7/2000 | Yang | |
| 6,192,083 B1 | 2/2001 | Linzer et al. | |
| 6,845,107 B1 * | 1/2005 | Kitazawa et al. | 370/537 |
| 2001/0014121 A1 | 8/2001 | Kaye et al. | |

* cited by examiner

*Primary Examiner*—Tung Vo
(74) *Attorney, Agent, or Firm*—McAndrews, Held & Malloy, Ltd.

(57) ABSTRACT

A buffer architecture and latency reduction mechanism for buffering uncompressed/compressed information. This combination provides for proficient division of the encoding task and quicker through put time. A single chip digital signal processing device for real time video/audio compression comprises a plurality of processors, including a video input processor, a motion estimation processor, a digital signal processor, and a bitstream processor, wherein processing and transfer of the signals within the device is done in a macroblock-by-macroblock manner. The device can include a multiplexing processor that is comprised of a storage unit which buffers a compressed video bitstream and a processor which retrieves the compressed video bitstream from the storage unit and produces a multiplexed data stream whereby the compressed video bitstream is processed in a pipeline manner.

7 Claims, 15 Drawing Sheets

*Interlaced video*

*Progressive video*

VIDEO ENCODING AND VIDEO/AUDIO/DATA MULTIPLEXING DEVICE

The present application is a divisional of U.S. patent application Ser. No. 09/543,904, filed on Apr. 6, 2000 now U.S. Pat. No. 6,690,726, entitled "Video Encoding and Video/Audio/Data Multiplexing Device." The present invention relates to video compression devices in general and to video encoding and video/audio/data multiplexing devices in particular.

FIELD OF THE INVENTION

The present invention relates to video compression device in general and to video encoding and video/audio/data multiplexing devices in particular.

BACKGROUND OF THE INVENTION

Methods for encoding an audio-visual signal are known in the art. According to these methods, a video signal is digitized, analyzed and encoded in a compressed manner. These methods are implemented in computer systems, either in software, hardware or combined software-hardware forms.

Most hardware encoding systems consist of a set of semiconductor circuits arranged on a large circuit board. State of the art encoding systems include a single semiconductor circuit. Such a circuit is typically based on a high-power processor.

Reference is now made to FIG. 1, which is a block diagram illustration of a prior art video encoding circuit 10.

Encoding circuit 10 includes a video input processor 12, a motion estimation processor 14, a digital signal processor 16 and a bitstream processor 18. Processors 12–18, respectively, are generally connected in series.

Video input processor 12 captures and processes a video signal, and transfers it to motion estimation processor 14. Motion estimation processor 14 analyzes the motion of the video signal, and transfers the video signal and its associated motion analysis to digital signal processor 16. According to the data contained within the associated motion analysis, digital signal processor 16 processes and compresses the video signal, and transfers the compressed data to bitstream processor 18. Bitstream processor 18 formats the compressed data and creates therefrom an encoded video bitstream, which is transferred out of encoding circuit 10.

It will be appreciated by those skilled in the art that such an encoding circuit has several disadvantages. For example, one disadvantage of encoding circuit 10 is that bitstream processor 18 transfers the encoded video bitstream, data word by data word, directly to an element external to encoding circuit 10. Accordingly, each time such data word is ready, the encoded video data word is individually transferred to the external element. Transfer of the encoded video in such a fashion greatly increases the data traffic volume and creates communication bottlenecks in communication lines such as computer buses. Additionally, circuit 10 requires a dedicated storage/bus which is allocated on a full time basis, hence, magnifying these disturbances.

Another disadvantage is that encoding circuit 10 is able to perform the encoding of video signals, only. Usually, moving picture compression applications include multiframe videos and their associated audio paths. While the encoding circuit 10 performs video compression and encoding, the multiplexing of compressed video, audio and user data streams are performed separately. Such an approach increases the data traffic in the compression system and requires increased storage and processing bandwidth requirements, thereby greatly increasing the overall compression system complexity and cost.

Reference is now made to FIG. 2, which is a block diagram of a prior art video input processor 30, as may be typically included in encoding circuit 10. Video input processor 30 includes a video capture unit 32, a video preprocessor 34 and a video storage 36. The elements are generally connected in series.

Video capture unit 32 captures an input video signal and transfers it to video preprocessor 34. Video preprocessor 34 processes the video signal, including noise reduction, image enhancement, etc., and transfers the processed signal to the video storage 36. Video storage 36 buffers the video signal and transfers it to a memory unit (not shown) external to video input processor 30.

It will be appreciated by those skilled in the art that such video input processor has several disadvantages. For example, one disadvantage of processor 30 is that it does not perform image resolution scaling. Accordingly, only original resolution pictures can be processed and encoded.

Another disadvantage is that processor 30 does not perform statistical analysis of the video signal, since in order to perform comprehensive statistical analysis a video feedback from the storage is necessary, thus allowing interframe (picture to picture) analysis, and processor 30 is operable in "feed forward" manner, only. Accordingly, video input processor 30 can not detect developments in the video contents, such as scene change, flash, sudden motion, fade in/fade out etc.

Reference is now made to FIG. 3 which is a block diagram illustration of a prior art video encoding circuit 50, similar to encoding circuit 10, however, connected to a plurality of external memory units. As an example, FIG. 3 depicts circuit 50 connected to a pre-encoding memory unit 60, a reference memory unit 62 and a post-encoding memory unit 64, respectively. Reference is made in parallel to FIG. 4, a chart depicting the flow of data within circuit 50.

Encoding circuit 50 includes a video input processor 52, a motion estimation processor 54, a digital signal processor 56 and a bitstream processor 58. Processors 54 to 58, respectively, are generally connected in series.

In the present example, video encoding circuit 50 operates under MPEG video/audio compression standards. Hence, for purposes of clarity, reference to a current frame refers to a frame to be encoded. Reference to a reference frame refers to a frame that has already been encoded and reconstructed, preferably by digital signal processor 56, and transferred to and stored in reference memory unit 62. Reference frames are compared to current frames during the motion estimation task, which is generally performed by motion estimation processor 54.

Video input processor 52 captures a video signal, which contains a current frame, or a plurality of current frames, and processes and transfers them to external pre-encoding memory unit 60. External pre-encoding memory unit 60 implements an input frame buffer (not shown) which accumulates and re-orders the frames according to the standard required for the MPEG compression scheme.

External pre-encoding memory unit 60 transfers the current frames to motion estimation processor 54. External reference memory unit 62 transfers the reference frames also to motion estimation processor 54. Motion estimation processor 54, reads and compares both sets of frames, analyzes the motion of the video signal, and transfers the motion analysis to digital signal processor 56.

Digital signal processor 56 receives the current frames from the external pre-encoding memory 60, and according to the motion analysis received from motion estimation processor 54, processes and compresses the video signal. Digital signal processor 56 then transfers the compressed data to the bitstream processor 58. Digital signal processor 56 further reconstructs the reference frame and stores it in reference memory 62. Bitstream processor 58 encodes the compressed data and transfers an encoded video bitstream to external post-encoding memory unit 64.

It will be appreciated by those skilled in the art that such an encoding circuit has several disadvantages. For example, one disadvantage of encoding circuit 50 is that a plurality of separate memory units are needed to support its operations, thereby greatly increasing the cost and the complexity of any encoding system based on device 50.

Another disadvantage is that encoding circuit 50 has a plurality of separate memory interfaces. This increases the data traffic volume and the number of external connections of encoding circuit 50, thereby greatly increasing the cost and the complexity of encoding circuit 50. Another disadvantage is that encoder circuit 50 does not implement video and audio multiplexing, which is typically required in compression schemes.

Reference is now made to FIG. 5, a block diagram illustration of a typical interlaced formatted video in a normal encoding latency mode. The top line depicts the video fields before encoding, while bottom line depicts compressed frames after encoding.

Video is generally received in a progressive or interlaced form. Typical interlaced rates are 60 fields/sec for NTSC standard and 50 fields/sec for PAL standard.

In order to minimize encoding latency, encoding circuits should begin processing of an image immediately after receipt of the minimal amount of image data. Video is comprised of a plurality of fields, wherein each frame has a top and bottom field, referenced herein as top m and bot m. The video fields illustrated in FIG. 5 are referenced top 0 and bot 0, top 1 and bot 1, etc. such that each pair of associated top and bot refers to a single frame.

Encoding circuits begin the encoding process after capturing M pictures, where M is defined as M=I/P ratio. I is defined as an I picture, which is the Intra frame or the first frame (frame 0) of the series of frames to be encoded, and P is a P picture, which is the predictive frame (frame 1), and is referenced from frame 0. The I/P ratio refers to a distance between successive I/P frames in video sequence. Typically, prior art encoding circuits, such as encoding circuit 10 or encoding circuit 50 begin processing the image after receipt of 2 or more pictures. Note that in FIG. 5, the I picture appears after the progression of 3 pictures, and as such, M=3.

It will be appreciated by those skilled in the art that such an encoding latency is a lengthy time period, and hence, has several disadvantages. One such disadvantage is that a large amount of storage is required to accumulate frames. Another disadvantage is that large latency does not enable use of encoding circuit 50 in time-sensitive interactive applications such as video conferencing and the like.

SUMMARY OF THE PRESENT INVENTION

It is an object of the present invention to provide a novel device for encoding and multiplexing an audio-visual signal.

The applicants have realized that prior art encoding devices do not provide optimal division of the encoding task effort and hence, have longer than desired through-put time. As such, the present invention provides a novel buffer architecture and latency reduction mechanism for buffering uncompressed/compressed information. The combination of the novel architecture, implemented with the latency reduction mechanism, provides for a proficient division of the encoding task effort and hence, a quicker through-put time.

In accordance with the present invention there is therefore provided a single chip digital signal processing device for real time video/audio compression. The device includes a plurality of processors, including a video input processor, a motion estimation processor, a digital signal processor, and a bitstream processor, wherein transfer of the signals within the device is done in a macroblock-by-macroblock manner, thus enabling pipeline macroblock-by-macroblock processing.

The video input processor receives, analyzes, scales and processes a digital signal. The motion estimation processor receives the processed signal, produces a motion analysis therefrom, and transfers the motion analysis to the digital signal processor. The digital signal processor, according to the motion analysis, compresses the processed signal and produces a compressed processed signal. A bitstream processor receives and formats the compressed processed signal.

Preferably, the device further includes a memory controller connected to the plurality of processors, wherein the memory controller controls data communication among the digital signal processor, the motion estimation processor, the video input-processor and an external storage unit.

Additionally, preferably the device includes a multiplexing processor which multiplexes a plurality of digital signals and produces a multiplexed stream and a global controller which controls and schedules the video input processor, the motion estimation processor, the digital signal processor, the bitstream processor, the multiplexing processor and the memory controller.

Preferably, the motion estimation processor, the digital signal processor, the bitstream processor and the multiplexing processor operate in parallel. As such, the motion estimation processor operates on macroblock a of frame I, the digital signal processor operates on macroblock b of frame I, the bitstream processor operates on macroblock c of frame I, the multiplexing processor operates on frame J, wherein a≧b≧c, and I≧J.

The video input processor includes a capture unit, an input video storage, a video storage, a pre-encoding processor, a scaler, a video processor and a controller.

The capture unit acquires a multiple frame video signal. The video storage buffers the multiple frame video signal thereby allowing adjustment between an internal video rate and an external data communication rate. The pre-encoding processor receives the multiple frame video signal from the capture unit and produces statistical analysis of the multiple frame video signal. The scaler receives the multiple frame video signal from the pre-encoding processor and modifies picture resolution. The video processor processes the multiple video signal. The controller controls and schedules the capture unit, the pre-encoding processor, the scaler, the video processor and the video storage. Alternatively, the input storage buffers the video signal thereby adjusting between an external communication rate and internal video rate.

Preferably, the multiple frame video signal is acquired from either a video interface or a host interface. Furthermore, the video input processor operates on frame K such that K≧I≧J.

In accordance with the present invention there is therefore provided a video compression system including a host interface, a memory unit and a digital signal processing device. The digital signal processing device receives a multiplicity of signals from the host interface and the memory unit and produces, in a pipeline macroblock-by-macroblock manner, a multiplexed encoded data stream.

Preferably, the multiplicity of signals include either a video signal, an audio signal, or a user data stream.

Preferably, the system additionally includes a video interface which supplies a video signal to the digital signal processing device. Alternatively, the system includes a compressed data interface which receives the encoded signal from the digital signal processing device and an audio interface which transfers a digitized audio/user data signal to the digital signal processing device.

In accordance with the present invention there is therefore provided a multiplexing processor which includes a first video storage, a second video storage, an audio/data storage, a processor and an output storage.

The first video storage buffers a compressed video bitstream, and transfers the compressed video bitstream to the external memory unit, thereby adjusting between internal video rate and external communication rate. The second video storage reads from the memory unit the compressed video bitstream, and buffers the compressed video bitstream, thereby adjusting between the external communication rate and the multiplexor processing rate rate.

The audio/data storage buffers the digitized audio/data signal and transfers the digitized audio/data signal to the processor, thereby adjusting between the external audio rate and the multiplexor processing rate. The processor connected to the first and second video storage, the audio/data storage and the output storage, and which produces a multiplexed video/audio data stream. The output storage buffers the multiplexed video/audio/data stream, thereby adjusting between multiplexed video/audio/data stream rate and external communication rate.

Preferably, the first video storage is connected to an external memory unit, wherein the first storage unit buffers the compressed video bitstream in a real time variable rate and transfers the compressed video bitstream in a burst to the memory unit.

Preferably, the second video storage transfers the compressed video bitstream in a real time variable rate to the processor, and wherein the external memory unit transfers the compressed video bitstream in a burst to the second video storage.

Additionally preferably, the audio/data storage is connected to an external audio source, wherein the audio/data storage transfers the digitized audio/data signal to the processor in a real time variable rate and the external audio source transfers the digitized audio/data signal in a burst to the audio/storage storage.

The external memory unit acts as a temporary encoded video buffer, thereby accumulating compressed video when the processor is unable to accept the compressed video. The multiplexing processor interfaces directly with a variety of communication devices, each the variety of communication devices having a different communication speed, such as a computer bus, and an asynchronous transmission line.

The digital signal processing device includes a plurality of processors, wherein the plurality of processors includes a digital signal processor, a bitstream processor, a motion estimation processor, and alternatively, a video input processor and a multiplexing processor.

Preferably, the digital signal processing device further includes a memory controller connected to the plurality of processors, wherein the memory controller controls data communication among the digital signal processor, the motion estimation processor, the video input processor and an external storage unit. Alternatively, the device further includes a global controller which controls and schedules the video input processor, the motion estimation processor, the digital signal processor, the bitstream processor, the multiplexing processor and the memory controller.

There is therefore provided in accordance with the present invention a method for encoding, including the steps of capturing a pipeline of a multiplicity of digitzed video frames and encoding the multiple digitized video frames, one macroblock at a time.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 6:
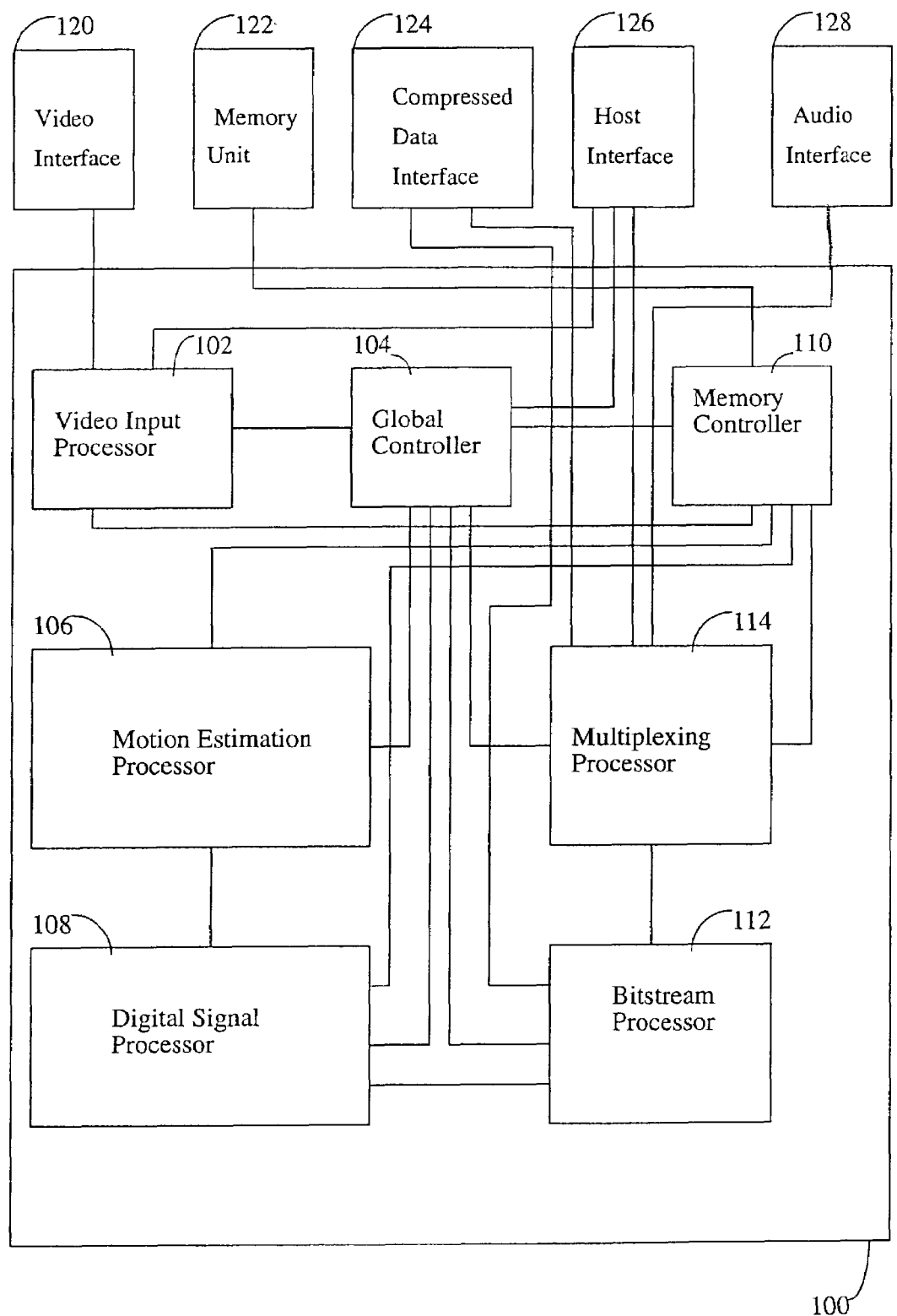
FIG. 6 is a block diagram of a video encoding video/audio/data multiplexing device constructed and operative in accordance with a preferred embodiment of the invention.

Reference is now made to FIG. 6, a block diagram of a video encoding video/audio/data multiplexing device 100, constructed and operative in accordance with a preferred embodiment of the invention.

The present invention overcomes the disadvantage of the prior art by providing a novel approach to video/audio compression and encoding, and, as per this approach, a novel encoding device structure which comprises a plurality of processors with a defined, optimized work division scheme.

Typically, a sequence of compression commands are instructions or a sequence of instructions, such as, removal of temporal redundancy, removal of spatial redundancy, and entropy redundancy of data, and the like. Device 100 operates according to an optimized compression labor division, thus segmenting the compression tasks between the different processors and reducing, in comparison to prior art, the compression time. This is supported by a latency reduction mechanism, to be explained in detail hereinbelow.

According to the present invention, device 100 is a massively parallel digital processor designed for the purposes of realtime video/audio compression and multiplexing, such as for MPEG encoding and the like. For purposes of clarity herein, multiplexing refers to the creation of a single synchronized stream of a plurality of unsynchronized audio and video streams. Device 100 can be incorporated in a single chip and installed in digital camcorders, recordable digital video disk (DVD), game machines, desktop multimedia, video broadcast equipment, video authoring systems, video streaming and video conferencing equipment, security and surveillance systems, and the like.

According to a preferred embodiment of the present invention, device 100 efficiently performs video compression tasks such as removing temporal redundancy (i.e., motion between frames), spatial redundancy (within frame), and entropy redundancy of data. Device 100 has a plurality of processors, each processor designed to perform a segment of the compression task, hence, achieving optimal performance of each such task.

The number of processors, the architecture of each processor, and the task list per processor, achieves the optimal tradeoff between device implementation cost and efficiency. Device 100 is supported by an inventive latency reduction mechanism, to be described herein below.

Device 100 includes a video input processor 102, a global controller 104, a motion estimation processor 106, a digital signal processor 108, a memory controller 110, a bitstream processor 112 and a multiplexing processor 114.

Device 100 is preferably connectable to a video interface 120, an external memory unit 122, a compressed data interface 124, a host interface 126, and an audio interface 128. Typically video interface 120 supplies a digital video signal and audio interface 128 supplies a digital audio signal.

Host interface 126 is typically connected to an external host (not shown) and acts as a user interface between device 100 and the user. Host interface 126 provides to device 100 microcodes, commands, data parameters and the like received from a user or a supervising system. Host interface 126 also provides information received from device 100 to the user. Host interface 126 provides access to the compressed data and is used to provide device 100 with uncompressed digitized video and/or audio and/or user data.

In a preferred embodiment of the present invention, device 100 is operable either in a programming mode or an operational mode, and is capable of operating in both modes simultaneously.

In the programming mode, an external host transfers, via host interface 126, microcodes, commands and data parameters to global controller 104. Global controller 104 transfers the microcodes, commands and data parameters to video input processor 102, motion estimation processor 106, digital signal processor 108, memory controller 110, bitstream processor 112 and multiplexing processor 114.

In the operational mode, video input processor 102 captures a motion video signal, via video interface 120, from an external video source (not shown). In an alternative embodiment processor 102 captures a motion video signal, via host interface 126.

Video input processor 102 then performs statistical analysis of the video signal, thereby detecting 3-2 pulled up sequences and developments in the video contents, such as scene change, sudden motion, fade in/fade out and the like. Video input processor 102 also performs resolution downscaling thereby allowing, or enabling compression not only of the original resolution frames, but also reduced resolution frames (such as SIF, half D1 etc.). Additionally, video input processor 102 also pre-processes the video signal, such as spatial filtering, noise reduction, image enhancement and the like. Furthermore, video input processor 102 decreases the frame rate by decimating (dropping) frames thus allowing flexible rate control. Since device 100 is operable in "feed forward" manner, in order to perform the statistical analysis, a video feedback from the memory unit 122 is implementable. Such feedback allows interframe (picture to picture) analysis.

Video input processor 102 accumulates the scaled and processed video data and transfers the data in bursts to memory unit 122, via memory controller 110. Memory controller 110 stores them in memory unit 122.

In a preferred embodiment, device 100 operates under MPEG video/audio compression standards. Hence, a data block represents a macroblock, which is a sixteen by sixteen matrix of luminance pixels and two, four or eight, eight by eight matrices of chrominance pixels as defined by MPEG standards. For purposes of clarity herein, reference to a reference frame refers to a frame that has already been encoded, reconstructed and stored in memory unit 112, and which is compared to the current frame during the motion estimation performed by motion estimation processor 106.

The memory controller 110 retrieves a current frame macroblock, and certain parts of the reference frames (referred hereto as search area) from memory unit 122 and loads them into motion estimation processor 106. Motion estimation processor 106 compares the current frame macroblock with the respective reference search area in accordance with a sequence of compression commands, thereby producing an estimation of the motion of the current frame macroblock. This estimation is used to remove temporal redundancy from the video signal.

Motion estimation processor 106 transfers the resulting motion estimation to global controller 104. Motion estimation processor 106 also transfers the current frame macroblock and the corresponding reference frames macroblocks to digital signal processor 108.

Digital signal processor 108 performs series of macroblock processing operations intended to remove the spatial redundancy of the video signal, such as discrete cosine transform, macroblock type selection, quantization, rate control and the like. Digital signal processor 108 transfers the compressed data to the bitstream processor 112. Digital signal processor 108 further processes the compressed frame, thus reconstructing the reference frames, and transfers the reconstructed reference frames to memory unit 122 via memory controller 110, thereby overwriting some of the existing reference frames.

Bitstream processor 112 encodes the compressed video data into a standard MPEG format, in accordance with a sequence of known in the art encoding commands. Bitstream processor 112 then transfers the encoded video data stream to compressed data interface 124. It will be noted that the compression data interface 124 is connectable to any data receptacle element, such as a storage unit, a transmission line, a computer bus or the like.

Bitstream processor 112 also transfers compressed video data stream to multiplexing processor 114.

According to one embodiment of the present invention, multiplexing processor 114 captures, via host interface 126, digitized audio and/or user data from an external audio/data source (not shown). According to an alternative embodiment of the present invention, multiplexing processor 114 captures the digitized audio and/or user data via audio interface 128.

Multiplexing processor 114 multiplexes the encoded video and the digitized audio and/or user data streams (as received from bitstream processor 112) and generates, according to a sequence of optimized multiplexing commands, MPEG standard format streams such as packetized elementary stream, program stream, transport stream and the like. Multiplexing processor 114 transfers the multiplexed video/audio/data streams to compressed data interface 124. Multiplexing processor 114 also transfers the multiplexed video/audio/data streams to host interface 126.

Global controller 104 controls and schedules the video input processor 102, the motion estimation processor 106, the digital signal processor 108, the memory controller 110, the bitstream processor 112 and the multiplexing processor 114.

In operational mode, the video is fed into device 100 in a horizontal raster scan manner, from the top-left pixel to the bottom-right pixel. Device 100 processes a number of successive macroblocks of the same frame and a number of successive frames at the same time. For example, while the motion estimation processor 106 processes macroblocks i through i+l of frame C, the digital signal processor 108 processes macroblocks j through j+m of frame C, the bitstream processor processes macroblocks h through h+n of frame C, the multiplexing processor 114 processes frames A through A+B, wherein i+l> . . . >i>j+m> . . . >j>h+n> . . . >h, and $C \geqq A+B \geqq \ldots \geqq A$.

It is noted that according to an alternative embodiment of the present invention, memory unit 122 is partitioned into many sub-areas, whereby the processors and controllers within device 100 are granted an access level which is selected from a list of access levels, such as read-write directly, read-write through the memory controller 110, no access, and the like. It will be appreciated by those skilled in the art that such a structure provides a great level of flexibility whereby the amount of memory assigned to each processor is allocated dynamically in real time.

Figure 7:
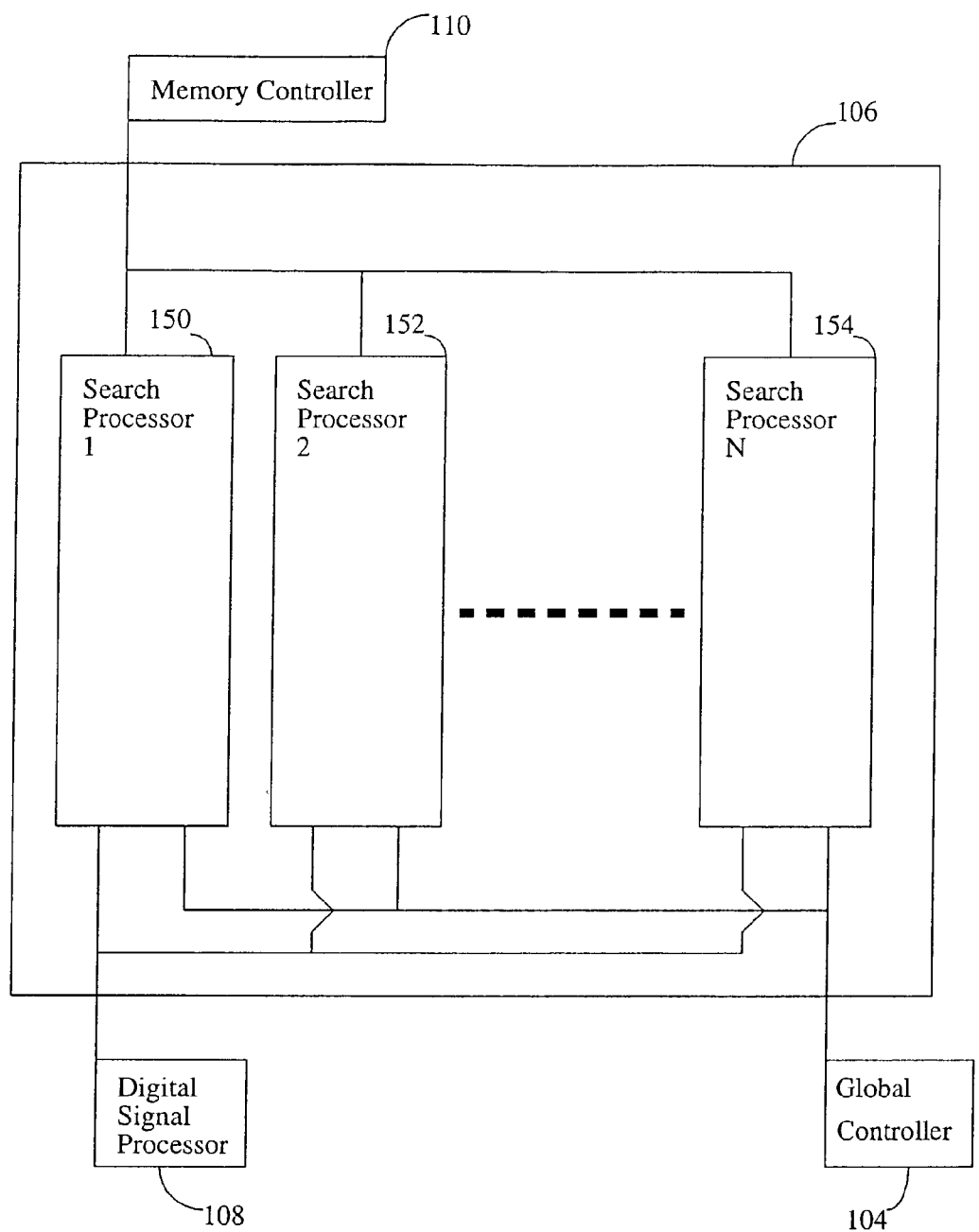
FIG. 7 is a block diagram of a motion estimation processor constructed and operative in accordance with a preferred embodiment of the invention.

Reference is now made to FIG. 7, which is a block diagram of the motion estimation processor 106, constructed and operative in accordance with a preferred embodiment of the present invention.

Motion estimation processor 106 includes a plurality of N search processors. FIG. 7 depicts three search processors, 150, 152 and 154, respectively. In a preferred embodiment of the present invention, motion estimation processor 106 is operable either in a programming mode or an operational mode, and is capable of operating in both modes simultaneously.

In one preferred embodiment, the programming mode, global controller 104 provides control parameters and data parameters as well as microcodes and a sequence of compression commands to each search processor 150, 152 and 154, respectively. Each search processor 150, 152 and 154 is operable under different sets of control parameters, initialization parameters, microcodes, as well as under different sequences of compression commands.

In operational mode, preferably, search processors 150, 152 and 154 are operable either in parallel or in a pipeline manner. In an example of a pipeline operation, search processor 150 processes $i^{th}$ macroblock, search processor 152 processes the $i+1^{th}$ macroblock, and search processor 154 processes the $i+N-1^{th}$ macroblock, simultaneously. In an example of parallel operation, search processors 150, 152 and 154 process different portions of the same macroblock.

According to an alternative embodiment of the present invention, search processors 150, 152 and 154 process different resolution frames. As an example, search processor 150 processes a reduced resolution frame and produces a low resolution motion analysis, while the search processor 152 processes an original resolution frame and produces an original resolution motion analysis, while the search processor 154 processes an increased resolution frame and produces an increased resolution motion analysis.

In one preferred embodiment of the operational mode, the current frame macroblock and the associated search areas are loaded into the applicable search processor i via memory controller 110. The applicable search processor i then performs a search procedure. The search processors 150, 152 and 154 can perform different types of searches, such as a full exhaustive search, telescopic search and the like, thereby producing the motion analysis. After the search is completed, the global controller 104 reads the motion analysis data from the search processors 150, 152 and 154. Motion estimation processor 106, as per the motion analysis, transfers the current frame macroblock and the reference frames macroblock to digital signal processor 108.

Figure 8:
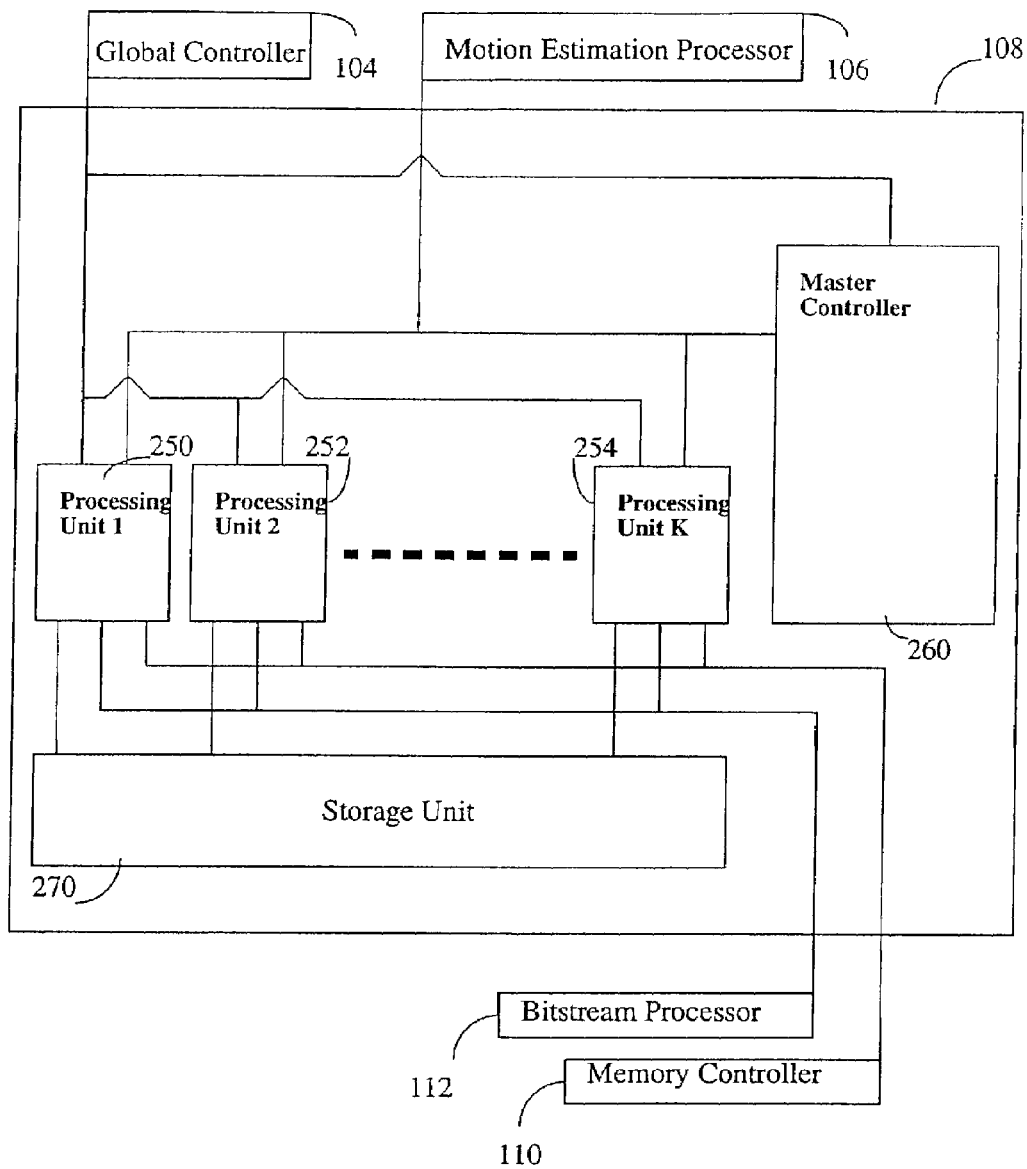
FIG. 8 is a block diagram of a digital signal processor constructed and operative in accordance with a preferred embodiment of the invention.

Reference is now made to FIG. 8, which is a block diagram of digital signal processor 108, constructed and operative in accordance with a preferred embodiment of the present invention.

Digital signal processor 108 includes a plurality of K processing units, a master controller 260 and a storage unit 270. FIG. 8 depicts 3 processing units, 250, 252 and 254, respectively.

Digital signal processor 108 is operable either in a programming mode or an operational mode, and is capable of operating in both modes simultaneously.

In the programming mode, global controller 104 transfers data and control parameters, as well as microcodes and a sequence of compression commands, to master controller 260 and processing units 250, 252 and 254, respectively. Preferably, the data transferred to each processing unit is independent from that transferred to each of the other processing units, and varies from processing unit to processing unit. Each processing unit 250, 252 and 254 is operable under a different set of control and data parameters, as well as under different sequences of compression commands.

In operational mode, master controller 260 and processing units 250, 252 and 254, operate in parallel, thereby greatly increasing the computational power of the digital signal processor 108.

Preferably, motion estimation processor 106 transfers the current macroblock and its associated reference frames macroblock to processing units 250, 252 and 254. Global controller 104 transfers the appropriate data parameters, such as the motion analysis and the like, to master controller 260.

Master controller 260, according to a sequence of optimized compression commands, performs processing procedures such as rate control, macroblock type selection, discrete cosine transform (DCT) type selection, and the like.

Processing units 250, 252 and 254 perform processing procedures on large data blocks, such as DCT, inverse DCT, quantization, inverse quantization, and the like. Preferably, each of processing units 250, 252 and 254 operate independently, processing different data blocks and performing different sequences of optimized compression commands. Digital signal processor 108 produces a set of quantized DCT coefficients and reconstructed reference frame data.

Each processing unit is capable of accessing the data blocks associated with each of the other processing units via storage unit 270. Furthermore, processing units 250, 252, and 254 are operable in parallel. It will be appreciated by those skilled in the art that such a structure greatly enhances the efficiency of processing and data transfer in the digital signal processor 108.

Once compression is completed, processing units 250, 252 and 254 transfer the compressed coefficient blocks to the bitstream processor 112. Master controller 260 transfers the appropriate data parameters to the global controller 104. Processing units 250, 252, 254 further reconstruct the encoded frame (reference frame) and transfer the reconstructed reference frame to memory unit 122 via memory controller 110, thus overwriting some of the existing reference frame.

Figure 9:
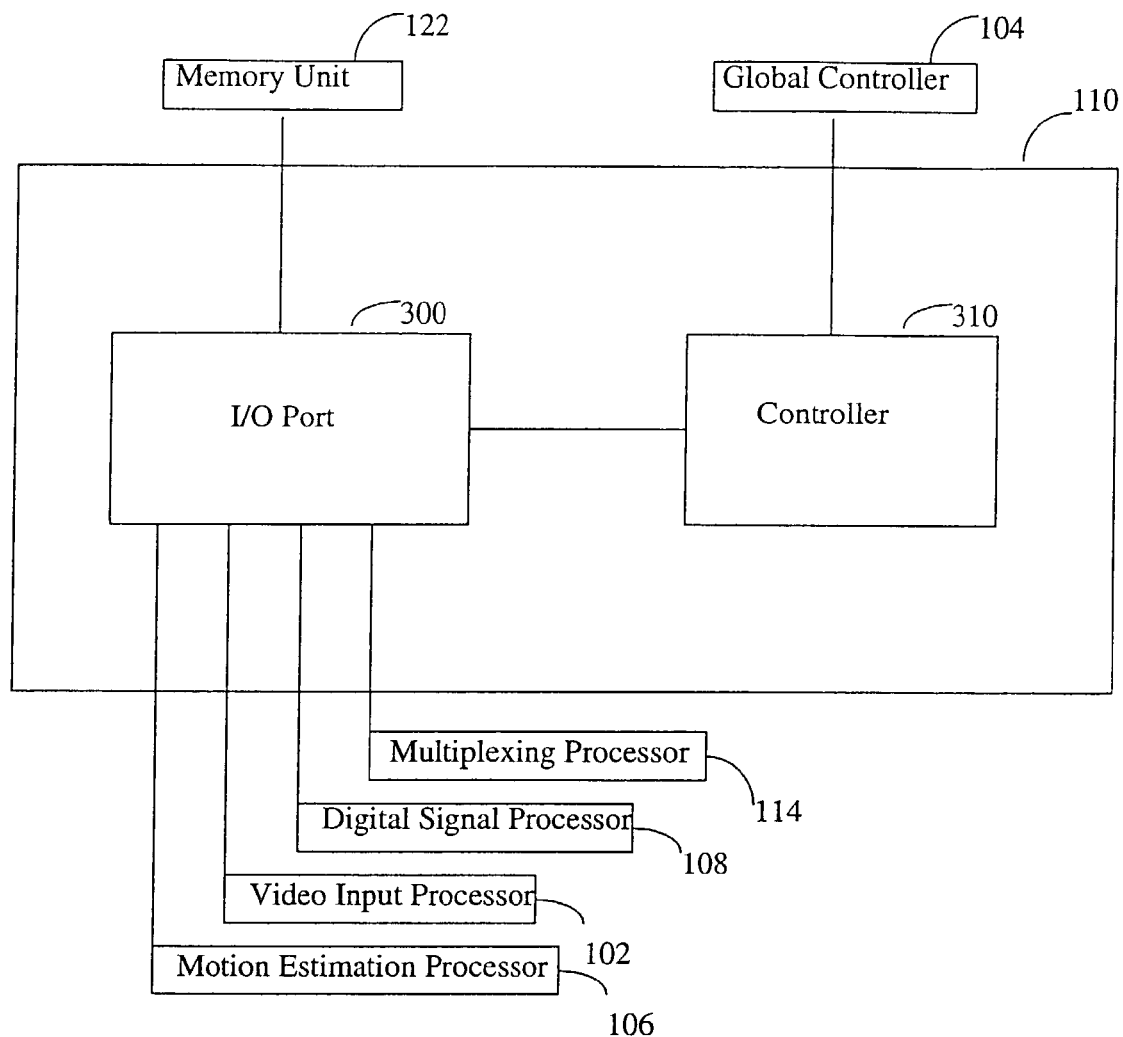
FIG. 9 is a block diagram of a memory controller constructed and operative in accordance with a preferred embodiment of the invention.

Reference is now made to FIG. 9, which is a block diagram of memory controller 110, constructed and operative in accordance with a preferred embodiment of the present invention.

Memory controller 110 includes an I/O port 300 and a controller 310. Memory controller 110 operates in either a programming mode or an operational mode, and is capable of operating in both modes simultaneously.

In programming mode, global controller 104 transfers data and control parameters to controller 310.

In operational mode, global controller 104 transfers a sequence of memory commands to controller 310. Controller 310 decodes the memory commands and sends the access instructions to I/O port 300. In accordance with the access instructions, I/O port 300 transfers data to/from memory unit 122 to digital signal processor 108, motion estimation processor 106, video input processor 102, and multiplexing processor 114. Preferably, the data transferred to each processor is independent from that transferred to each of the other processors, and varies from processor to processor.

In high density memories such as DRAM, SDRAM and the like, the data transfer is comprised of an access stage and a data read/write stage. Memory controller 110 and the internal partition of memory unit 122 are optimized to perform burst (large data block) transfers, thus reducing the number of memory access stages. Hence, the data transfer time comprises mostly data read/write time, and thus, the total data transfer time is greatly reduced.

Memory controller 110 organizes data communication between the different processors of device 100 and external memory unit 122, thereby implementing burst transfer. Thus each processor receives a continuous time segment for the data transfer and whereas all processors are serviced serially, one after the other, thereby greatly reducing the communication bandwidth requirements of device 100.

Figure 10:
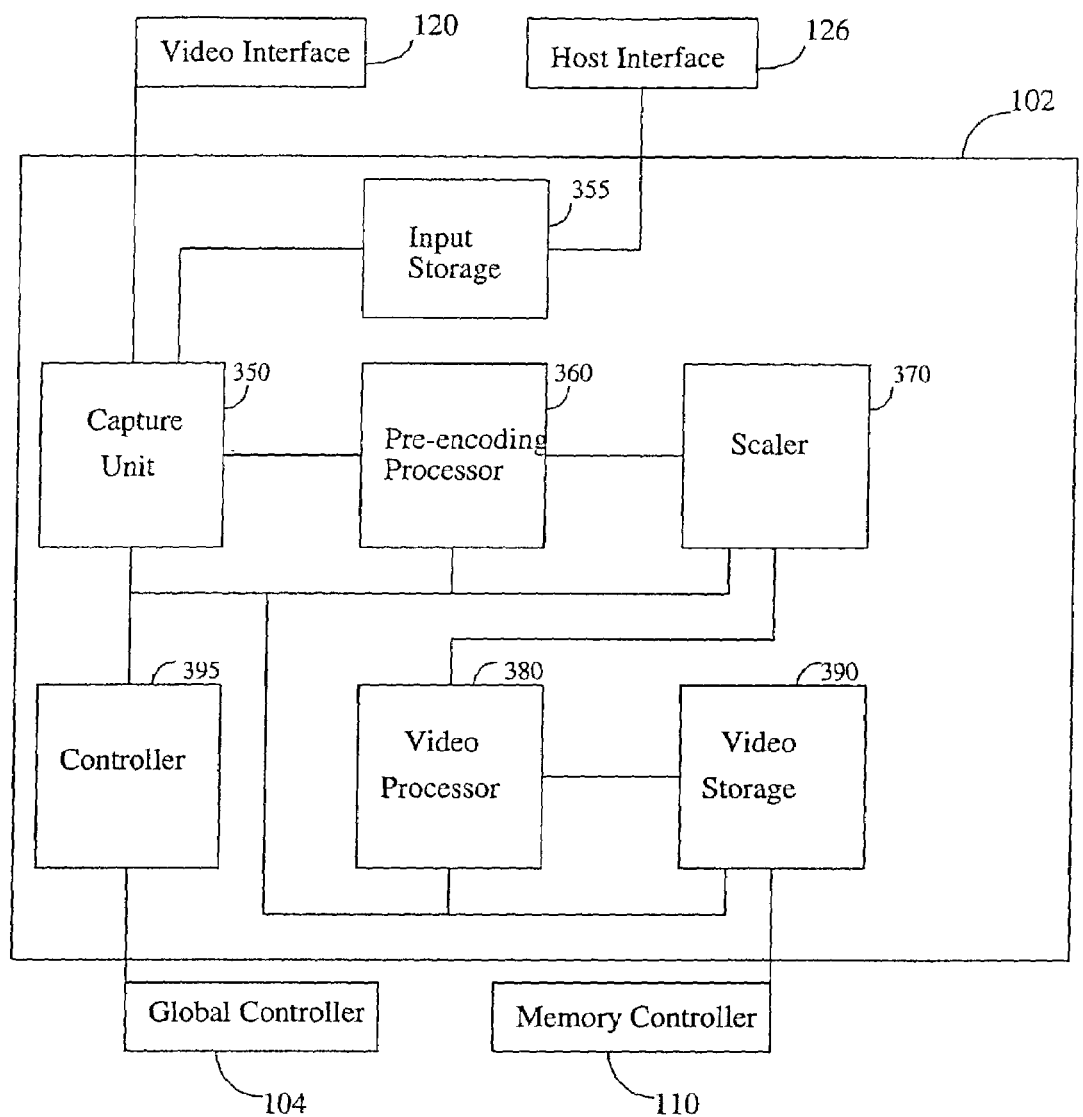
FIG. 10 is a block diagram of a video input processor constructed and operative in accordance with a preferred embodiment of the invention.

Reference is now made to FIG. 10, which is a block diagram of video input processor 102, constructed and operative in accordance with a preferred embodiment of the present invention.

Video input processor 102 includes a capture unit 350, an input storage 355, a pre-encoding processor 360, a scaler 370, a video processor 380, a video storage 390 and a controller 395. Capture unit 350 receives, via video interface 120, a digitized video signal from a digitized video source, (not shown).

Preferably, video input processor 102 operates in either a programming mode and/or an operational mode, and is capable of operating in both modes simultaneously.

In programming mode, global controller 104 transfers data and control parameters, as well as a sequence of video commands, to controller 395.

In operational mode, capture unit 350 acquires an input video signal. Capture unit 350 is synchronized to an external video source according to its associated format, its resolution, and the like. Capture unit 350 transfers the video synchronization signals to controller 395. Controller 395 analyses the video synchronization signals and further transfers the video synchronization information to global controller 104.

Capture unit 350 transfers the captured video data to pre-encoding processor 360. Pre-encoding processor 360 performs statistical analysis of the video signal and transfers this analysis to controller 395. Controller 395 produces scene analysis and transfers it to global controller 104. The scene analysis detects scene changes, sudden movement, fade in/fade out, 3-2 pull-up, and the like. Pre-encoding processor 360 transfers the compressed video bitstream to scaler 370. Controller 395 schedules and controls units 350, 360, 370, 380 and 390. Controller 395 can further reduce the frame rate below original video source rate.

Scaler 370 receives the video signal and performs image resolution reduction. This reduces the amount of information required to transmit the compressed video signal, thereby greatly expanding the spectrum of applications of the device 100. Scaler 370 transfers the scaled video signal to video processor 380.

Video processor 380 performs a series of known in the art video processing procedures to enhance the scaled video signal. The video processing procedures also include color format conversion, noise reduction, image enhancement, and the like. Video processor 380 transfers the processed video signal to video storage 390.

Video storage 390 accumulates the processed video signal and provides the communication interface with memory controller 110. Video storage 390 adjusts the data rates of an external video signal to the internal data communication rates. Video input processor 102 buffers the processed video signal in a real time variable rate, whereas the memory controller 110 transfers the video data block to memory unit 122 in a burst. This greatly reduces the communication bandwidth requirements, and makes the usage of the memory unit 122 more efficient.

In another preferred embodiment of the invention, video input processor 102 receives digitized video signal via the host interface 126. The digitized video signal is transferred in bursts to the input storage 355. Input storage 355 buffers the video signal thereby adjusting from the external video rate (via host interface) to the internal data communication rate. Input storage 355 further transfers the video signal to the capture unit 350.

Figure 11:
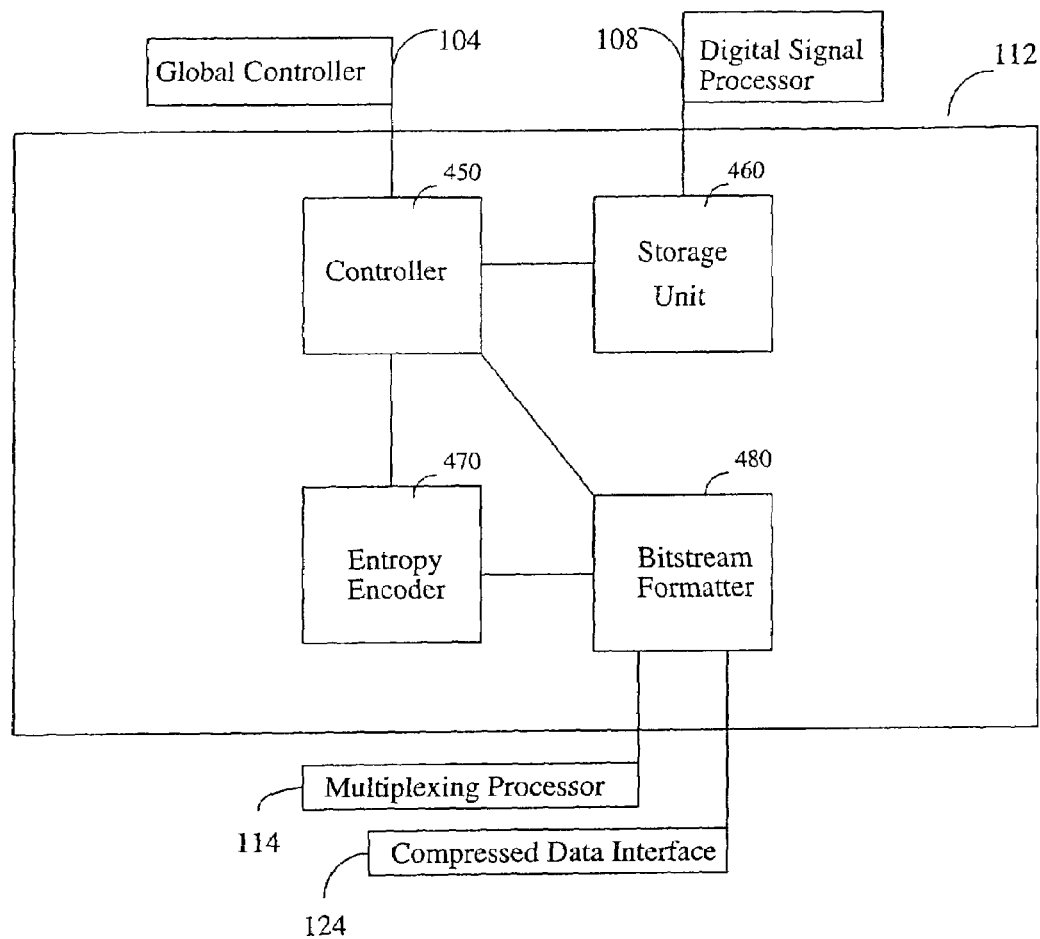
FIG. 11 is a block diagram of a bitstream processor constructed and operative in accordance with a preferred embodiment of the invention.

Reference is now made to FIG. 11, which is a block diagram of bitstream processor 112, constructed and operative in accordance with a preferred embodiment of the invention.

Bitstream processor 112 includes a controller 450, a storage unit 460, an entropy encoder 470 and a bitstream formatter 480. Bitstream processor 112 operates in either a programming mode or an operational mode, and is capable of operating in both modes simultaneously.

In the programming mode, global controller 104 transfers data and control parameters, as well as a sequence of encoding commands, to controller 450.

In operational mode, digital signal processor 108 transfers compressed coefficient blocks to storage unit 460. Global controller 104 transfers motion analysis data to the controller 450. Controller 450 reads the compressed coefficients from the storage unit 460. Controller 450 further processes those compressed coefficients as well as the motion analysis data, and other data such as macroblock type, quantizer scale, closed caption and other VBI data and user data and the like, and transfers the processed data to entropy encoder 470. Controller 450 further controls and schedules storage unit 460, entropy encoder 470 and bitstream formatter 480.

Entropy encoder 470 performs a series of encoding procedures, such as run-length encoding, constant length encoding, variable length encoding, and the like, thereby producing encoded data. Entropy encoder 470 transfers the resultant encoded data to bitstream formatter 480.

Bitstream formatter 480 receives the encoded data and, in accordance with standard requirements, such as MPEG, produces a compressed video data bitstream. Preferably, entropy encoder 470 and bitstream formatter 480 operate in parallel, thereby increasing the hardware resources utilization of bitstream processor 112.

Figure 12:
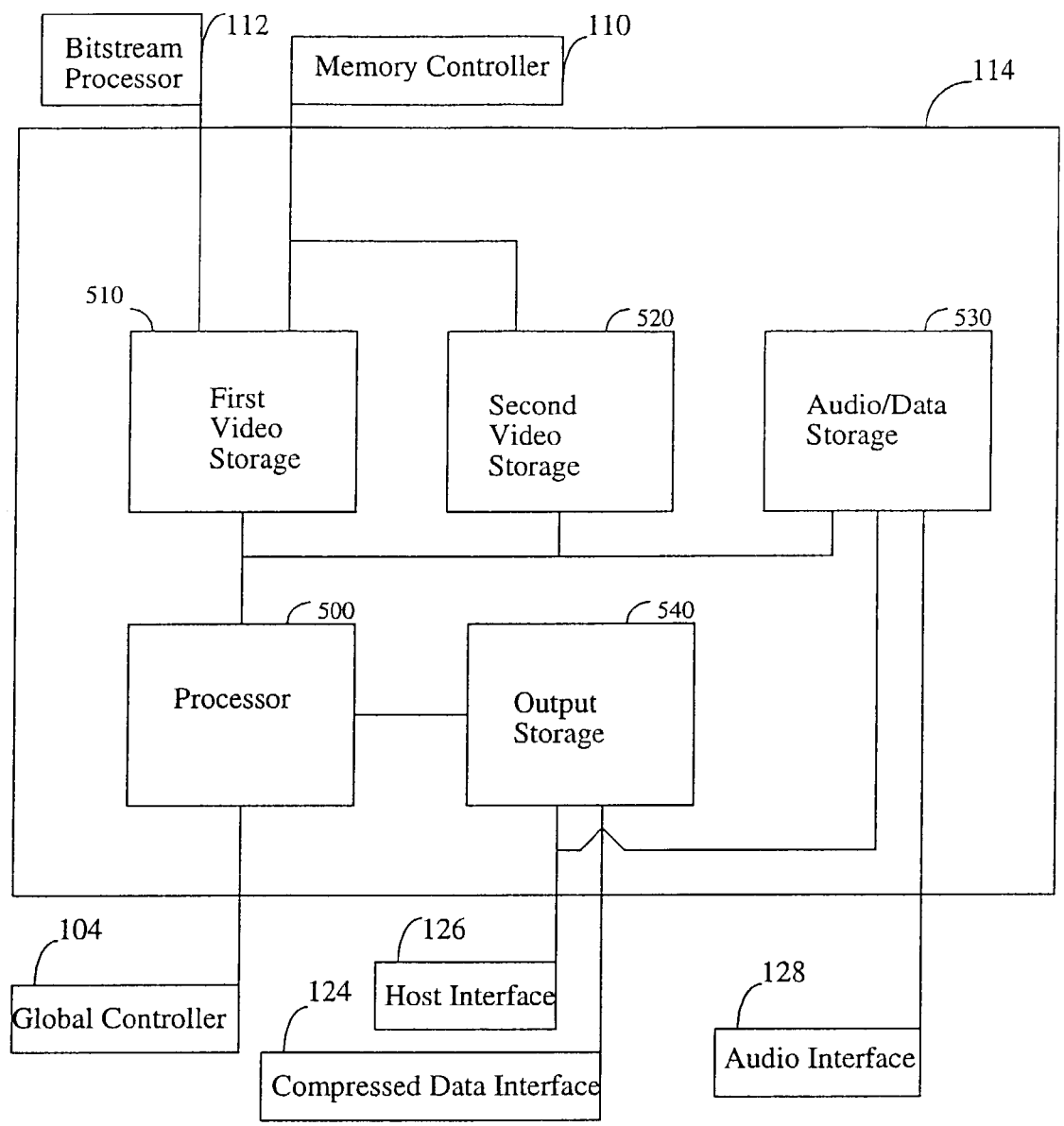
FIG. 12 is a block diagram of a multiplexing processor constructed and operative in accordance with a preferred embodiment of the invention.

Reference is now made to FIG. 12, which is a block diagram of multiplexing processor 114, constructed and operative in accordance with a preferred embodiment of the present invention.

Multiplexing processor 114 includes a processor 500 and multiple storages. The storages depicted in FIG. 12 are a first video storage 510, a second video storage 520, an audio/data storage 530 and an output storage 540. Multiplexing processor 114 is operable in either a programming mode or an operational mode, and is capable of operating in both modes simultaneously.

In the programming mode, the global controller 104 transfers data and control parameters, as well as a sequence of multiplexing commands, to processor 500.

In operational mode, the bitstream processor 112 transfers a compressed video bitstream to first video storage 510. First video storage 510 accumulates the compressed video bitstream and provides communication interface with memory controller 110.

First video storage 510 adjusts the data rates of compressed video data to the external communication rates. Multiplexing processor 114 buffers the compressed video bitstream in a real time variable rate, whereas, memory controller 110 transfers the compressed video bitstream in a burst to memory unit 122. This greatly reduces the communication bandwidth requirements, and makes the usage of memory unit 122 more efficient.

Second video storage 520 reads the compressed video bitstream, via memory controller 110, from memory unit 122. Second video storage 520 transfers the compressed video data to processor 500 and adjusts the external communication rates to the data communication rates in multiplexing processor 114.

Second video storage 520 transfers the compressed video to processor 500 in a real time variable rate, whereas, memory unit 122 transfers the compressed video in a burst, via memory controller 110, to second video storage 520. This greatly reduces the communication bandwidth requirements, and makes the usage of the memory unit 122 more efficient.

It will be appreciated by those skilled in the art that this multiple level storage architecture allows dynamic allocation of a large temporary video buffer in external memory unit 122. Hence, device 100 is capable of accumulating large amounts of compressed video when an external receiving device is unable to accept the compressed video from the device 100, or if an external audio source is unable to transfer the digitized audio to the device 100. This greatly increases the tolerance of the device 100.

Audio/data storage 530 reads the digitized audio and/or user data either via host interface 126, or via audio interface 128. Audio/data storage 530 transfers the digitized audio and/or user data to processor 500. Processor 500 further accumulates video, audio and user data related parameters such as sizes, time microcodes and the like. Processor 500 additionally controls and schedules units 510, 520, 530 and 540.

Audio/data storage 530 adjusts the external communication rates to the data communication rates in multiplexing processor 114. Audio/data storage 530 transfers the digitized audio and/or user data to processor 500 in a real time variable rate, whereas, the external audio source transfers the digitized audio and/or user data in a burst to audio/data storage 530. This greatly reduces the communication bandwidth requirements.

Processor 500 multiplexes, in accordance with standard requirements, such as MPEG, the compressed video and digitized audio and/or user data and produces a multiplexed video/audio/data stream such as program stream, transport stream, and the like. Processor 500 transfers the multiplexed video/audio/data stream to output storage 540.

Output storage 540 accumulates the multiplexed video/audio/data stream and transfers it either to host interface 126, or to compressed data interface 124. Output storage 540 adjusts the data rates of the processor 500 to the external communication rates.

Multiplexing processor 114 buffers the multiplexed video/audio/data stream in a real time variable rate, whereas, either host interface 126 or the compressed data interface 124 can read the multiplexed video/audio/data stream in a burst or otherwise. This allows device 100 to interface directly with a variety of communication devices with different communication speed such as computer bus, asynchronous transmission line and the like, thereby simplifying the encoder system design and reducing the encoder system cost.

Figure 13:
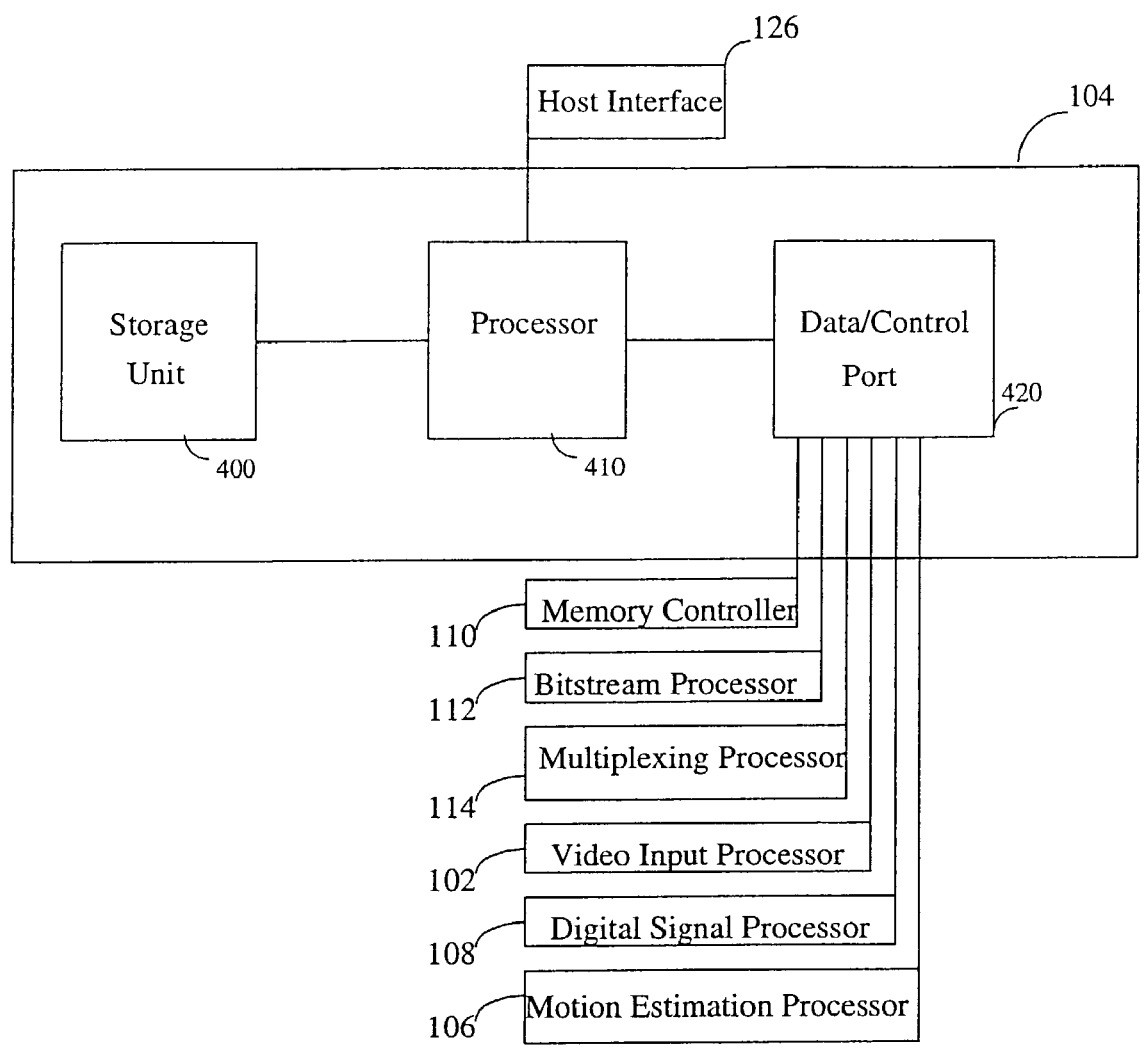
FIG. 13 is a block diagram of a global controller constructed and operative in accordance with a preferred embodiment of the invention.

Reference is now made to FIG. 13, which is a block diagram of global controller 104, constructed and operative in accordance with a preferred embodiment of the present invention.

Global controller 104 includes a storage unit 400, a processor 410 and a data/control port 420.

Briefly referencing FIG. 6, global controller 104 schedules, synchronizes and controls video input processor 102, motion estimation processor 106, digital signal processor 108, memory controller 110, bitstream processor 112, and multiplexing processor 114. Global controller 104 also initializes and performs a variety of test procedures on video input processor 102, motion estimation processor 106, digital signal processor 108, memory controller 110, bitstream processor 112, multiplexing processor 114 and external memory unit 122.

The global controller 104 operates in either a programming mode or an operational mode, and is capable of operating in both modes simultaneously.

In the programming mode, an external host loads data and control parameters, as well as sequences of control, video, compression, memory, encoding, and multiplexing commands, into processor 410. Processor 410 transfers the data, microcodes, and the control parameters, as well as the control command sequence, to storage unit 400.

Processor 410 transfers the sequences of video, compression, memory, encoding and multiplexing commands to video input processor 102, motion estimation processor 106, digital signal processor 108, memory controller 110, bitstream processor 112, and multiplexing processor 114, respectively.

The external host loads a predetermined control pattern into processor 410, thus instructing global controller 104 to perform according to the operational mode.

In the operational mode, processor 410 receives video synchronization information from video input processor 102, and acting upon such, synchronizes to an external video source.

According to a sequence of control commands, processor 410 produces a series of control, data read and data write instructions, which are then transferred to data/control port 420.

As per the control instructions, data/control port 420 provides control and synchronization signals to video input processor 102, motion estimation processor 106, digital signal processor 108, memory controller 110, bitstream processor 112, and multiplexing processor 114.

According to the data read instructions, data/control port 420 reads the run-time data such as motion analysis, scene analysis, macroblock information, and the like, from video input processor 102, motion estimation processor 106, digital signal processor 108, memory controller 110, bitstream processor 112, and multiplexing processor 114.

According to the data write instructions, data/control port 420 transfers the run-time data to video input processor 102, motion estimation processor 106, digital signal processor 108, memory controller 110, bitstream processor 112, and multiplexing processor 114.

Storage unit 400 is used as temporary storage for data, as well as control parameters. According to a sequence of control commands, in operational mode, processor 410 accesses storage unit 400. Storage unit 400 thus accumulates data and control parameters received via host interface 126, as well as accumulating status parameter/data received from controller 110 and processors 102, 106, 108, 112 and 114.

It will be noted by those skilled in the art, that device 100 encodes in an assembly line fashion, e.g. each processor/controller performs a specialized processing task and transfers the signal onto the next processor/controller for processing. This encoding method produces an optimized division of labor and a quicker signal through-put time.

Figure 14:
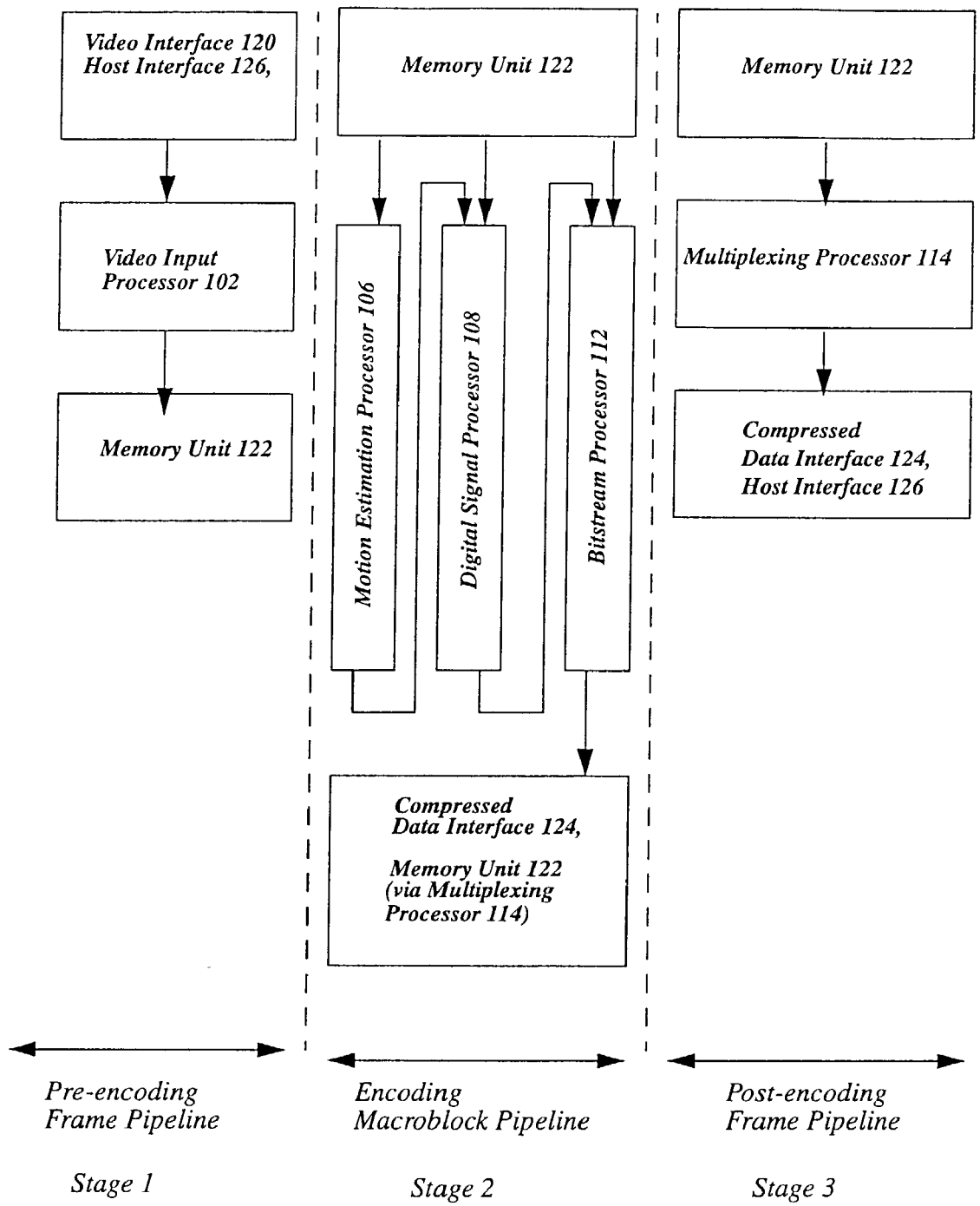
FIG. 14 is a flow chart of the data flow within the device illustrated in FIG. 6, provided in operative in accordance with a preferred embodiment of the invention.

Reference is now made to FIG. 14, a diagram depicting the multiple level pipeline organization implemented in device 100. The multiple level pipeline flow of data progresses through three stages: from a pre-encoding frame pipeline stage (stage 1) to an encoding macroblock pipeline stage (stage 2) to a post-encoding frame pipeline stage (stage 3).

In the pre-encoding stage video interface 120, host interface 126, video input processor 102, and memory unit 122 operate on frames A through A-B. In the encoding macroblock stage, memory unit 122, motion estimation processor 106, digital signal processor 108, bitstream processor 112, compressed data interface 124 and memory unit 122, via bitstream processor 112, operate on frame C. In the post encoding stage, memory unit 122, multiplexing processor 114, compressed data interface 124, and host interface 126 operate on frames D through D-E, wherein, $A \geqq \ldots \geqq A\text{-}B \geqq C \geqq D \geqq \ldots \geqq D\text{-}E$. All three stages operate in parallel, thereby greatly increasing the performance of device 100 and enabling a low encoding latency.

In the pre-encoding stage (stage 1), video interface 120, or host interface 126, transfer a multiple frame A through A-B to video input processor 102. The data as transferred from interface 120 or 126 is as yet un-processed data, and still in raw data form.

Video input processor 102 receives the multiple frames A through A-B, processes them, and transfers the processed video signal to memory unit 122. At this point in the flow, (the last step in stage 1, which is also the first step in stage 2), motion estimation processor 106, digital signal processor 108 and bitstream processor 112 have immediate access to the processed video signal.

In the encoding macroblock stage (stage 2), memory unit 122 transfers data to motion estimation processor 106, digital signal processor 108 and bitstream processor 112, respectively. Motion estimation processor 106 receives and processes macroblocks i though i+l of the current frame C. Digital signal processor 108 processes macroblocks j though j+m of the current frame C, and further reconstructs and transfers macroblocks j though j+m of the reference frame to memory unit 122. Bitstream processor 112 processes macroblocks h though h+n of the current frame C and transfers the encoded data to memory unit 122 and/or to compressed data interface 124.

In a preferred flow, $i+l \geqq \ldots \geqq i \geqq j+m \geqq \ldots \geqq j \geqq h+n \geqq \ldots \geqq h$. Additionally, preferably motion processor 106, digital processor 108 and bitstream processor 112 operate in parallel.

In the post-encoding stage (stage 3), multiplexing processor 114 receives (from memory unit 122) encoded frames D through D-E and multiplexes the frames with a digitized audio/user data. The multiplexed data stream is transferred to compressed data interface 124 or to host interface 126, which therefrom, is transferred to a receiving device external to device 100.

It will be appreciated by those skilled in the art that stage 1, stage 2 and stage 3 operate in parallel, and hence the data flow within device 100 is generally efficient and rapid. It is additionally noted that memory unit 122 is a buffer which stores data between stage 1 and stage 2, and between stage 2 and stage 3. Hence, if any one stage operates quicker than any other stage, memory unit 122 stores the data until that appropriate stage is available for more data. Hence, device 100 enables a flexible data flow rate, and is capable of regulating its flow to that of external units.

Figure 15:
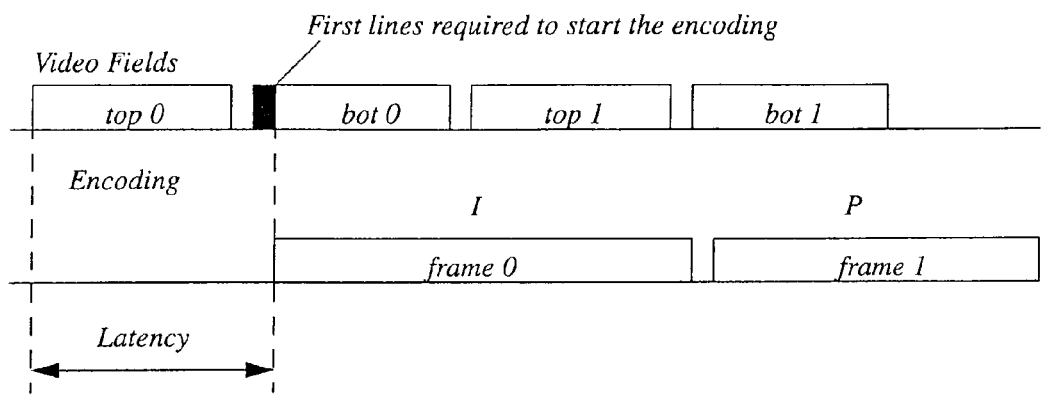
FIG. 15 is a block diagram of an encoding latency mode provided in operative in accordance with a preferred embodiment of the invention.
Figure 15:
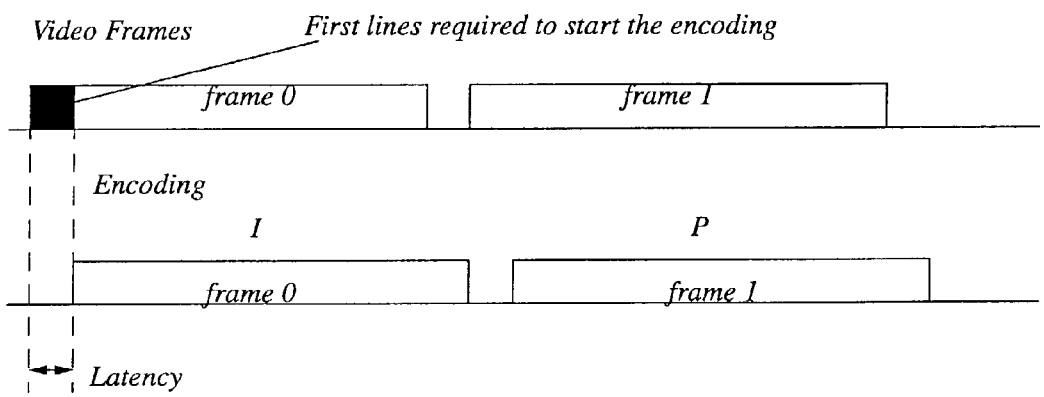

Reference is made to FIG. 15, a timing diagram illustration of pipeline encoding as per an encoding latency reduction mechanism 200, known herein as encoder 200. Encoder 200 is operated and constructed in accordance with a preferred embodiment of the present invention. Preferably, encoder 200 is implemented in device 100. Reference is also made in parallel to FIG. 6.

Figure 1:
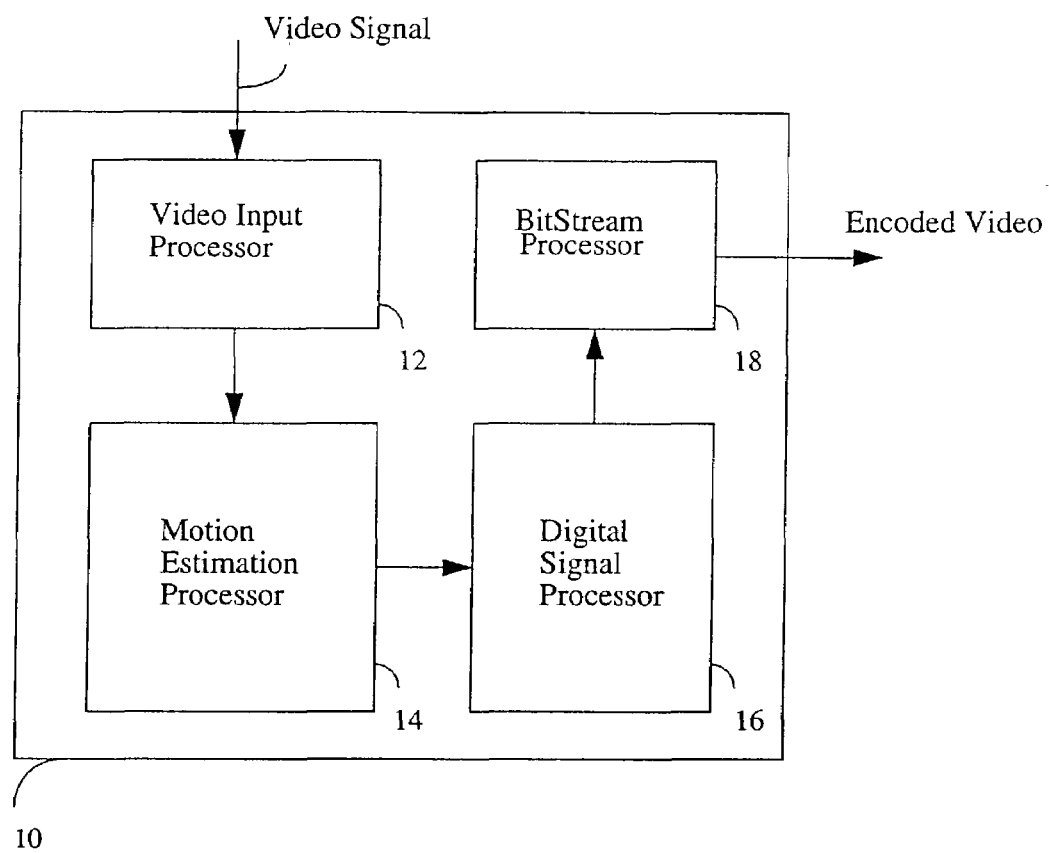
FIG. 1 is a block diagram of a prior art video encoding circuit.
Figure 2:
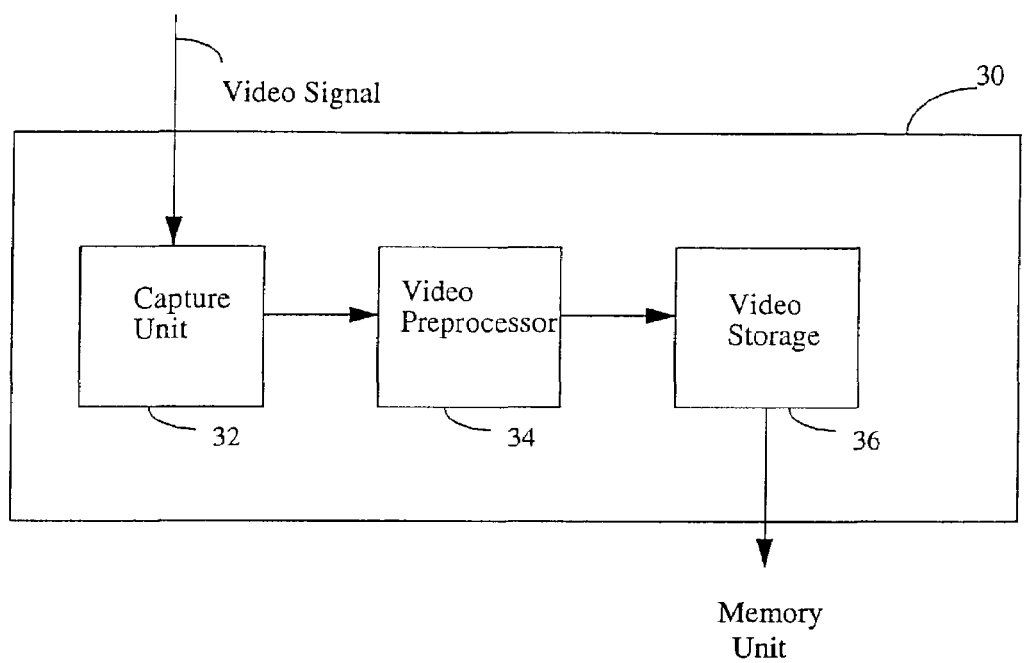
FIG. 2 is a block diagram of a prior art video input processor.
Figure 3:
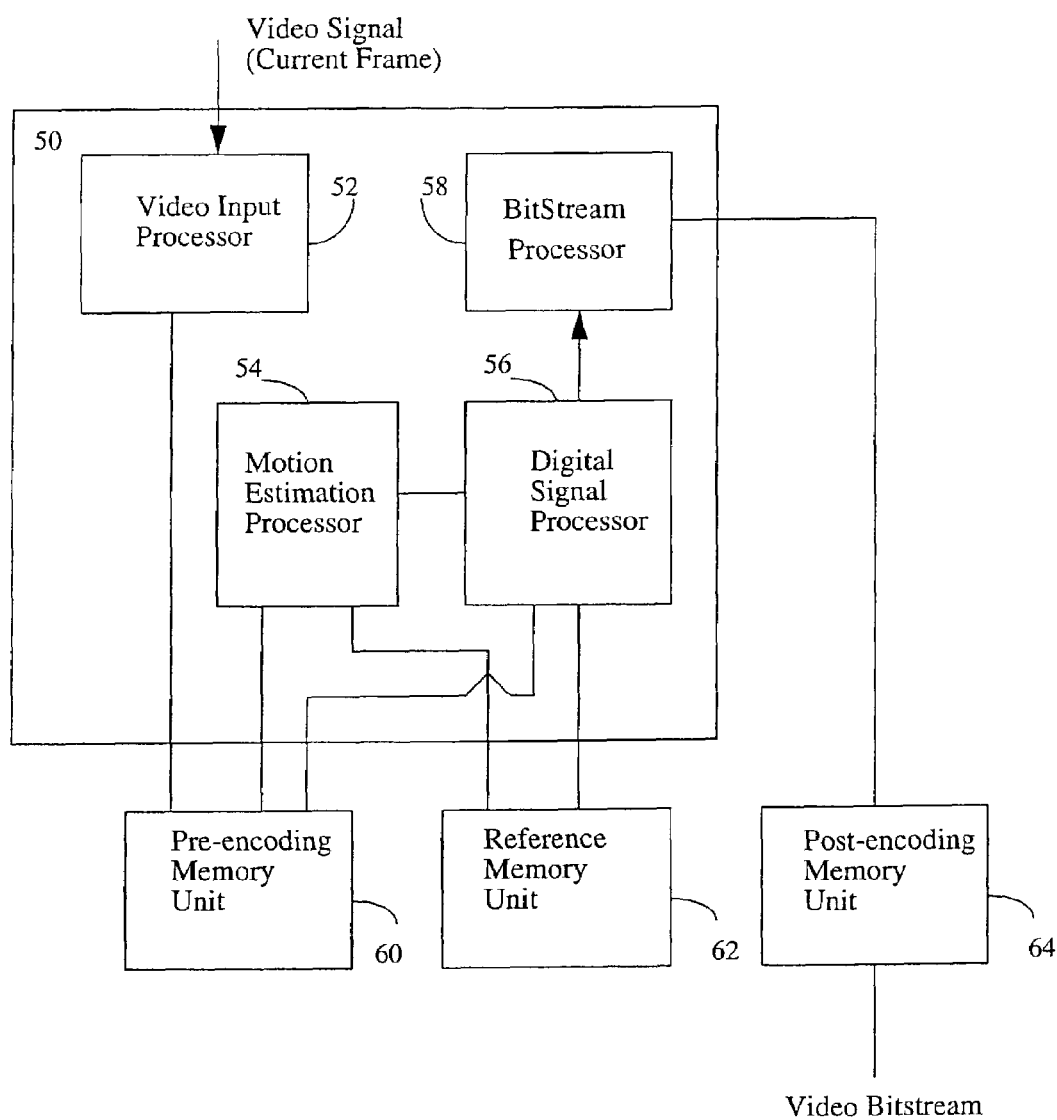
FIG. 3 is a block diagram of a prior art video encoding circuit linked to a plurality of external memory units.
Figure 4:
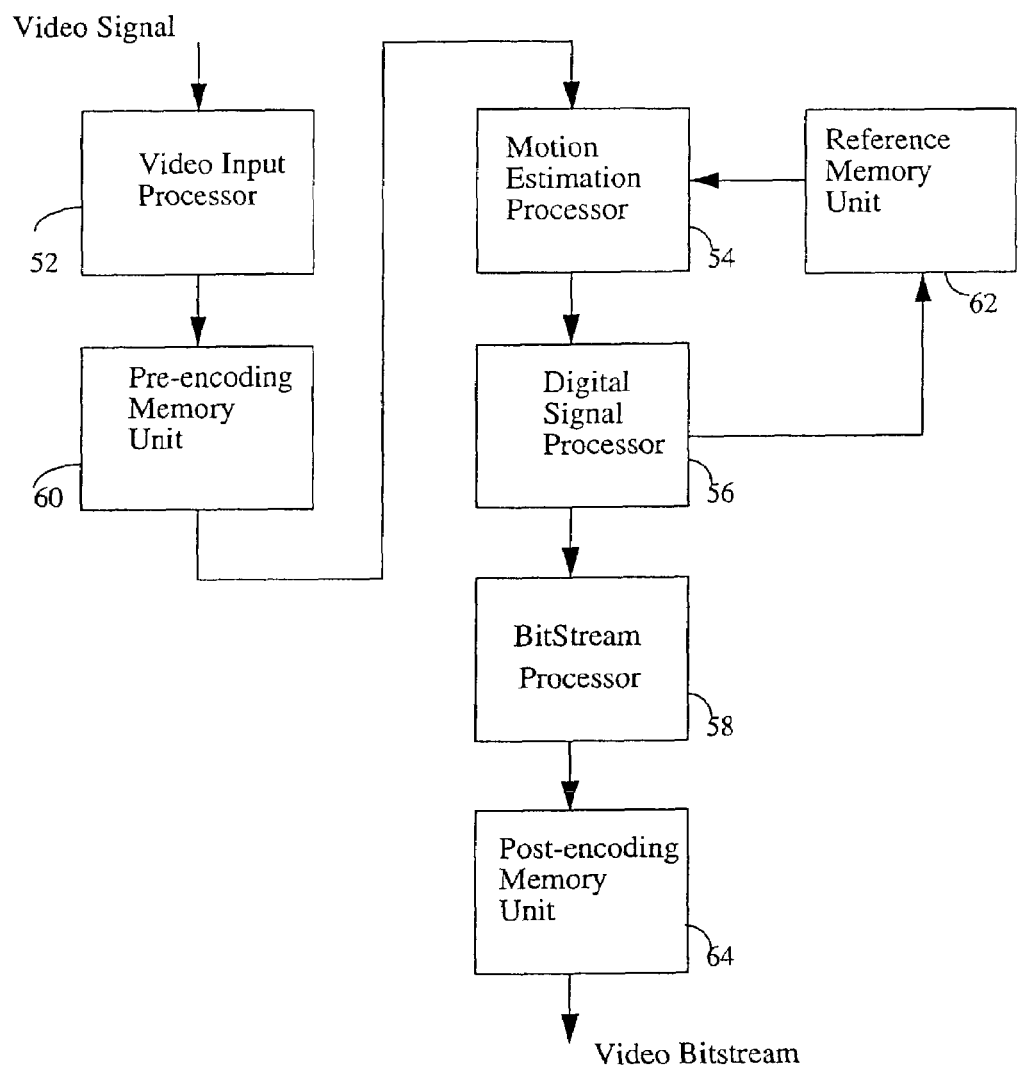
FIG. 4 is a flow chart of the data flow within the prior art circuit illustrated in FIG. 3.
Figure 5:
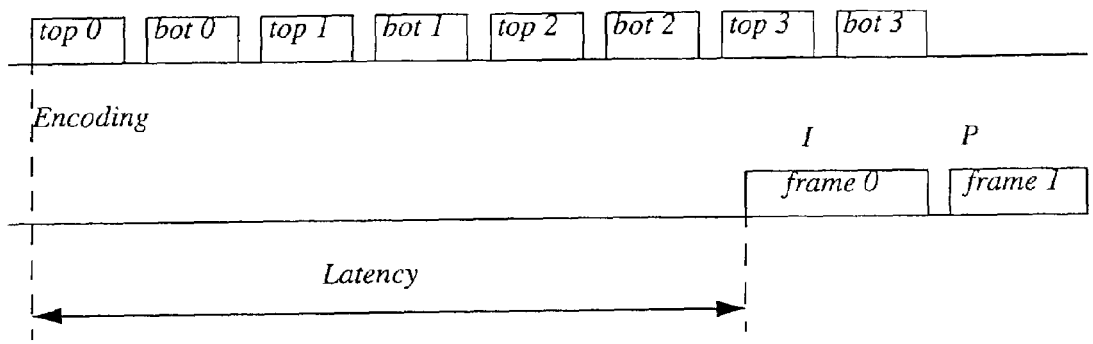
FIG. 5 is a timing diagram of a typical video field pipeline in a normal encoding latency mode.

Reference is also made briefly to FIG. 5. Elements illustrated in FIG. 15 which are similar to those elements illustrated in FIG. 5 are labeled with similarly referenced numerals, and will not be described further hereinbelow. Furthermore, for purposes of clarity in the understanding of FIG. 15, a macroblock, as previously defined hereinabove, is a block of data.

Additionally, as is known to those skilled in the art, video frames are comprised of a number of lines, generally numbered 0, 1, 2, 3, etc. Typically a video is transferred in either a progressive format or an interlaced format.

In interlaced formatting, the lines of fields are segregated into even lines and odd lines, i.e. even lines include 0, 2, 4 etc. and odd lines include 1, 3, 5 etc. thus comprising even (top) and odd (bottom) fields.

In progressive formatting, the video is transferred progressively, i.e. one after another, line 0, line 1, line 2, line 3, etc. are transferred.

For purposes of clarity herein, interlaced formatting refers to the field by field formatting, while progressive formatting refers to the frame by frame formatting.

FIG. 15 illustrates both interlaced and progressive formatting. As noted hereinabove, device 100 encodes in a macroblock-by-macroblock manner. This method of encoding enables encoder 200 to start encoding after first few video lines are captured. If the video is interlaced formatted, the encoding process begins after the first field (i.e.: top 0) and a part of the second field associated with the first macroblock of an image (i.e.: bot 0), are recorded. Alternatively, if the video is progressively formatted, the encoding begins after the lines associated with the first macroblock of an image are recorded.

In a preferred embodiment of a low latency mode, if the video is interlaced formatted, encoder 200 begins encoding once the first field and at least first 8 lines of the second field of the first frame are captured. If the video is progressively formatted, encoder 200 begins encoding once the at least 16 first lines of a frame are captured. In this preferred embodiment, since the first frame of the video sequence is I picture, no reference frame is required for encoding. In this preferable mode, M=I/P ratio=1.

It is noted that in order to operate in the low latency mode, i.e.: when M=1, the group of pictures (GOP) structure is IP and does not contain a B picture (not shown), where B pictures are Bi-directional pictures referencable from either picture I or picture P.

In preferred embodiment of the present invention, encoder 200 starts to output compressed video data with a latency of generally 5 ms (progressive video) or generally 20 ms (interlaced video). The resultant encoding latency is dependent on the video standard used, i.e. either NTSC or PAL. This is in contrast to prior art encoders which latency is 100 ms through 150 ms.

It will be noted that the present invention provides a video encoding video/audio/data multiplexing device which can be easily adapted to ISO/IEC 11172 (MPEG-1) standard as well as ISO/IEC 18313 (MEPG-2) standard as well as other compression standards such us H.320, H.261, H.263 as well as motion JPEG standard.

It will be appreciated by those skilled in the art that the present invention is not limited to what has been particularly shown and described hereinabove. Rather the scope of the present inventions is defined by the claims which follow.

The invention claimed is:

1. A multiplexing processor comprising:
   a first storage unit operable to buffer video data coming into the multiplexing processor and transfer said video data to a memory unit external to the multiplexing processor, thereby adjusting between an incoming data communication rate and an external memory communication rate;
   a second storage unit operable to receive said video data from said external memory unit and buffer said video data, thereby adjusting between said external memory communication rate and an internal multiplexor processing rate; and
   a processor operable to retrieve said video data from said second storage unit and produce a multiplexed data stream.

2. A multiplexing processor according to claim 1, further comprising:
   a third storage unit operable to buffer a digitized audio/user data signal and transfer it to said processor, thereby adjusting between a digitized audio/data rate and said internal multiplexor processing rate.

3. A multiplexing processor according to claim 2, further comprising:
   a fourth storage unit operable to buffer said multiplexed data stream and transfer it to an external receiving device, thereby adjusting between said internal multiplexor processing rate and an external receiving device communication rate.

4. A multiplexing processor according to claim 1, wherein said first storage unit is connected to a memory controller external to the multiplexing processor, wherein said first storage unit is operable to buffer said incoming video data in a real time variable rate and wherein said external memory controller is operable to transfer said video data in a burst to said external memory unit.

5. A multiplexing processor according to claim 1, wherein said second storage unit is operable to transfer said video data in a real time variable rate to said processor, and wherein said external memory unit is operable to transfer said video data in a burst to said second storage unit.

6. A multiplexing processor according to claim 2, wherein said third storage unit is connected to an external audio source, wherein said third storage unit is operable to transfer said digitized audio/user data signal to said processor in a real time variable rate and said external audio source is operable to transfer said digitized audio/data signal in a burst to said third storage unit.

7. A multiplexing processor according to claim 1, wherein said external memory unit acts as a temporary video buffer, accumulating video data when said processor is unable to accept said video data.

* * * * *